(12) United States Patent
Wolff et al.

(10) Patent No.: US 9,266,296 B2
(45) Date of Patent: Feb. 23, 2016

(54) METHOD FOR MAKING A COLORED PLASTIC FILM

(71) Applicant: Benecke-Kaliko AG, Hannover (DE)

(72) Inventors: Roland Wolff, Seelze (DE); Michael Maeker, Hannover (DE); Dirk Iben, Sereetz (DE); Oliver Stahlhut, Wedemark (DE)

(73) Assignee: Benecke-Kaliko AG, Hannover (DE)

( * ) Notice: Subject to any disclaimer, the term of this patent is extended or adjusted under 35 U.S.C. 154(b) by 0 days.

(21) Appl. No.: 14/339,364

(22) Filed: Jul. 23, 2014

(65) Prior Publication Data

US 2014/0333081 A1    Nov. 13, 2014

Related U.S. Application Data

(63) Continuation of application No. PCT/EP2013/050032, filed on Jan. 3, 2013.

(30) Foreign Application Priority Data

Jan. 23, 2012    (DE) .......................... 10 2012 100 534

(51) Int. Cl.
*B41J 3/407* (2006.01)
*B29C 59/00* (2006.01)
*B29C 59/02* (2006.01)
*B29D 99/00* (2010.01)
*B44C 1/24* (2006.01)
*B44C 5/04* (2006.01)
*B44F 9/00* (2006.01)
*B60R 13/02* (2006.01)

(52) U.S. Cl.
CPC .............. *B29D 99/001* (2013.01); *B29C 59/00* (2013.01); *B29C 59/02* (2013.01); *B44C 1/24* (2013.01); *B44C 5/04* (2013.01); *B44F 9/00* (2013.01); *B60R 13/02* (2013.01); *B41J 3/4073* (2013.01)

(58) Field of Classification Search
CPC combination set(s) only.
See application file for complete search history.

(56) References Cited

U.S. PATENT DOCUMENTS 2,035,760 A    3/1936  Reese
4,116,737 A    9/1978  Svens
(Continued)

FOREIGN PATENT DOCUMENTS

DE         43 24 970 A1     1/1995
DE    10 2005 046 264 A1    4/2007
(Continued)

OTHER PUBLICATIONS

Machine-generated translation of DE 10 2010 025159, published on Dec. 2011.*

(Continued)

*Primary Examiner* — Huan Tran
(74) *Attorney, Agent, or Firm* — Walter Ottesen P.A.

(57) ABSTRACT

A method for making a plastic film having a three-dimensionally structured and colored surface includes the steps of: providing the film with a three-dimensional surface structure via a shaping process; determining the provided topography of the film surface via a scanning process; and, applying a coloring to the surface after the topography of the surface has been determined. A device configured to apply the coloring to the surface is controlled such that the application of the coloring to the surface is changeable in dependence upon at least one of topological data of the surface and macroscopic shapes of the surface.

10 Claims, 2 Drawing Sheets

(56) References Cited

U.S. PATENT DOCUMENTS

| | | | |
|---|---|---|---|
| 5,429,682 A * | 7/1995 | Harlow et al. | 118/681 |
| 5,645,884 A * | 7/1997 | Harlow et al. | 427/8 |
| 5,886,317 A | 3/1999 | Hinrichs et al. | |
| 5,916,643 A * | 6/1999 | Spain et al. | 428/31 |
| 7,001,016 B2 * | 2/2006 | Baxter et al. | 347/101 |
| 7,381,443 B2 * | 6/2008 | Konno et al. | 427/146 |
| 8,181,407 B2 * | 5/2012 | Garcia et al. | 52/311.2 |
| 2003/0218663 A1 | 11/2003 | Baxter et al. | |

FOREIGN PATENT DOCUMENTS

| | | | | |
|---|---|---|---|---|
| DE | 10 2010025159 | * | 12/2011 | B44C 5/04 |
| WO | 03/010007 A1 | | 2/2003 | |

OTHER PUBLICATIONS

International Search Report dated Mar. 27, 2013 of international application PCT/EP2013/050032 on which this application is based.

* cited by examiner

METHOD FOR MAKING A COLORED PLASTIC FILM

CROSS REFERENCE TO RELATED APPLICATIONS

This application is a continuation application of international patent application PCT/EP2013/050032, filed Jan. 3, 2013, designating the United States and claiming priority from German patent application 10 2012 100 534.6, filed Jan. 23, 2012, and the entire content of both applications is incorporated herein by reference.

FIELD OF THE INVENTION

The invention relates to a method for making a plastic film having a three-dimensionally structured and colored surface, in particular a film for use for the interior trim of vehicles, here, for example, for dashboards and interior door trim panels of motor vehicles or for wall, roof and floor trim panels of aircraft or water craft, or else a film for furniture surfaces or other articles of use.

BACKGROUND OF THE INVENTION

Production methods of this type for plastic films are known. For instance, DE 43 24 970 A1 discloses a method for producing three-dimensionally structured surfaces with the aid of an embossing roll, the surface of the embossing roll representing the negative form of the surface to be embossed. This technique is used for the production of thermoplastic films as a substitute for natural surfaces with a highly complex structure, such as calf leather, buffalo leather, et cetera, which has fine pores and is provided with a complex grain structure. Here, the surface of a positive form is machined with the aid of laser engraving, the laser (beam) being controlled in the process by way of data which were previously obtained with the aid of optical or mechanical scanning of the original surface. A method of this type can be used firstly to produce an embossing roll directly and without the requirement of further intermediate steps. Secondly, a method of this type also permits the production of intermediate forms or intermediate rolls which correspondingly contain the positive or the negative of the surface structure of the original surface.

U.S. Pat. No. 5,886,317 discloses a method for engraving a pattern into the surface of a workpiece, in which the surface information in the form of electric control signals is likewise generated and is stored with the aid of optical or mechanical scanning of a surface of a pattern master, which surface information is then used to control the engraving laser. Here, in the region of the transitions or joints, the surface information which is obtained there from the pattern master is engraved multiple times one after another onto the workpiece as an identical pattern. It is also disclosed to engrave the same surface information multiple times and/or alternately in an inverse information sequence (that is, forward and backward), and also to apply it with a certain randomness. By way of methods of this type, the transitions become somewhat softer, but still remain visible.

These methods in the prior art are suitable for the previously customary production of films which are more or less single-color, with the exception of a somewhat slightly "cloudy" coloring or large-area color change, as exists between different functional regions in films of this type, for example in dashboard films between the region close to or below the windshield, which region is to be configured to be as low-reflective and dull-colored as possible, and the region in the footwell which is to appear as comfortable and bright-colored as possible.

Color changes of this type are produced nowadays by way of, for example, gravure printing methods, in which the film which is provided with a surface structure or an embossing is colored in a color printing unit with the aid of color impression rolls. Methods of this type are expensive and inflexible, since always only the same color transition can be produced by way of one roll. In addition, the printed image cannot be reproduced in a suitable quality without relatively great expenditure.

When work is carried out by way of a classic printing unit, a reproducible homogeneity can be produced only with difficulty, since the press setting (throwing on of the rolls) usually takes place indirectly via the setting of the press nip. If the thickness of the material fluctuates, more or less of the structure is provided with coloring depending on the pressure or the pressure distribution, and the printed image and therefore the color application and the color distribution vary.

Films with color transitions are produced nowadays in large-scale production for different vehicles. Some color separation lines which are of very striking configuration even have to be hidden behind a cover which separates the two color regions, on account of the unsatisfactory printed image.

All the known methods have disadvantages such that either color boundaries cannot be produced accurately, or that "flowing" color transitions from one color to the other require considerable outlay for multiple rotary printing and, in addition, produce a printed image which can have fluctuations during the production. Moreover, the observer often has the perception that structures of the embossed three-dimensional surface of films of this type and the coloring do not "fit together" and sees and feels, for example, immediately that artificial leather in no way achieves the visual and haptic impression of the original.

The subjective evaluation by way of the human eye is still an extremely precise way of assessing a structural surface, which up to now has not been capable of being replaced by way of automatic methods, which evaluation by way of the human eye clearly registers even very small changes in the appearance or color of the surface. Transitions or boundary regions, the formation of repeating patterns and moulette stripes are as clearly noticeable as colorings which seem to be "unnatural". Moreover, the phenomenon exists that the human eye assesses a surface which is observed from a relatively great distance in a completely different way to an observation at a small distance. It can therefore be the case that, for instance, an artificial leather surface which is observed in detail and from a small distance appears homogeneous, whereas the same artificial leather surface is discerned as being bumpy, streaky and unnatural in color when observed from a distance of several meters.

SUMMARY OF THE INVENTION

It is an object of the invention to avoid these disadvantages and to provide a method, by way of which a colored plastic film with a three-dimensional surface structure can be produced, it being possible for the film to be produced as desired in terms of color with exact color boundaries or defined transition regions or two-color systems, in which the surface structure and coloring have an appearance which is identical to the original, and no repeating patterns, joints or moulette stripes are discernible, and a faultless printed image is achieved.

The method of the invention is for making a plastic film having a three-dimensionally structured and colored surface. The method includes the steps of: providing the film with a three-dimensional surface structure via a shaping process; determining the provided topography of the film surface via a scanning process; and, applying coloring to the surface after the topography of the surface has been determined, wherein a device configured to apply coloring to the surface is controlled such that the application of coloring to the surface is changeable in dependence upon at least one of topological data of the surface and macroscopic shapes of the surface.

Here, the film is first of all provided with a three-dimensional surface structure by way of shaping methods. Afterward, the topology of the film surface, which topology is produced by way of the shaping method, is determined with the aid of a scanning method which is, for example, laser-controlled, the associated topological data being stored. Subsequently, the surface is provided with a color application, a device which colors the surface, for example a varnishing device or color application device, being controlled in such a way that the coloring of the surface can be changed depending on the topological data and/or the macroscopic shapes of the surface, that is, for instance, also depending on the curves in the dashboard which are later present after the application of the film to a carrier or projections of a two-color door trim panel. As a result, the film is given transition or boundary regions which are defined exactly in terms of color, the coinciding surface structure and coloring imparting a faultless configuration to the observer. It is essential here that the coloring and embossing are adapted to one another, and that the application of coloring does not take place by way of methods (rolls) which operate without feedback to the surface structure which was actually present before the application of coloring.

One advantageous development consists in that, during the coloring of the surface, the color intensity and/or the color per se or the mixture thereof can be changed depending on the topological data of the surface. In particular, in interaction with an embodiment, in which the device which colors the surface is controlled in such a way that a two-color system is applied which merges one into another at its boundary regions, what is known as "gradient printing" can be produced in a particularly satisfactory manner, in which the coloring flow of the color transmission between two differently colored surfaces can be positioned in a very flexible manner.

A further embodiment which is advantageous because it can be carried out in a particularly simple manner and using conventional roll technology consists in that the film is provided with an embossed three-dimensional surface structure with the aid of an embossing roll.

A further advantageous embodiment consists in that the printing device is configured as a digital printing device, in particular as an inkjet printer. In digital printing, printing is carried out in a manner which is independent of repeating patterns, and any desired color areas can be produced with separation lines which run as desired. One example for the use of multiple-color films of this type is the trimming of the interior side of car doors.

By way of the use of digital printing technology, a color design of the film can be carried out with completely new effects, and the color and structure can be correlated in the abovementioned sense in such a way that the structure, for example therefore the topological properties in the form of an embossing, and the printed image lie congruently on one another. The visual and haptic impressions are therefore brought into coordination and an overall appearance is achieved as in the case of the original surface.

This applies, in particular, in combination with a further advantageous embodiment, in which the three-dimensional surface structure which is applied by way of shaping methods is an identical impression of natural surfaces, for example leather, wood, stone, et cetera, and therefore in particular in the production of artificial leathers which are identical to natural leather, to pictures, in which the structure accentuates the spatial depth.

A further advantageous embodiment consists in that the three-dimensional surface structure which is applied by way of shaping methods is configured in the form of homogeneous domes or projections which are as a rule rounded and are raised up from the surface. If the surface is then provided with an application of coloring by way of the device configured to apply coloring according to the invention which is controlled in a manner which is dependent on the surface structure, the domes or projections can be provided with a "cap" in another color than the current film color. This operation which is what is known as "tip printing" is therefore a special form of a two-color film.

When work is carried out by way of a classic printing unit, a reproducible homogeneity would be capable of being produced only with great difficulty, since the press setting (throwing on of the rolls) usually takes place indirectly via the setting of the press nip. If the thickness of the material fluctuates, the printed image or the size of the applied dome print also changes immediately.

If, however, according to the invention a digitally operating printing system is combined with the method, for example, and the grained structure is detected via a scanner before entry into the printing system, the print job can be carried out in a regulated manner and always in the desired size and position.

If the size of the structure is detected, the desired dome varnishing can always be applied, even in the case of variable or chaotically configured structural elements, as also occur, for example, on a leather surface. Scanners which are configured, for example, as laser scanners can be used for the detection of the size and position of the domes or projections. The necessary resolution and the scanning rates are decisive features for the selection of the suitable scanner.

A further advantageous embodiment consists in that the control of the coloring of the surface takes place depending on the scanned topological data and/or the macroscopic shapes of the surface with the aid of reference marks which are provided on the surface. Coloring with precise repeating patterns on an embossing structure is ensured in this way, it being possible for special effects to be realized on a film by way of the superimposition of the embossing structure and printed image.

For example, a depth effect can be increased visually by way of dark colors in the region of deep grain points and lighter colors in the region of elevated grain points, or special effects, such as the accentuation of grain features, can be produced by way of corresponding color combinations.

Special grain points can likewise be emphasized particularly by way of color accentuation. Up to now, these design options have not been able to be realized using analog technologies, since this type of superimposition of printed and embossed image was not able to be realized on account of thermal expansion and deformations during varnish drying and in the embossing process in the case of a film.

Coloring with precise repeating patterns is now possible by way of the digital printing technology, in contrast. If the grain structure is detected by way of a scanner before the printing unit, for example the inkjet print head, the printed image can be positioned on the embossing structure with precise repeating patterns. Since the subject here in this case is grain images and printed images, the detection of the structure can also be carried out via reference marks, similar to the repeat marks in color printing. Compressions or extensions of this structure can then be transferred to the printed image by way of the information, namely in the context of a further advantageous embodiment of the invention which consists in that the coloring of the surface is carried out in such a way that following compressions or extensions of the film can be compensated for visually.

A film of this type is particularly suitable for trimming parts which have to be re-shaped and adapted to a particularly pronounced extent, that is, for instance an interior trim part for a vehicle.

Overall, advantages result during the use of the method according to the invention by virtue of the fact that the three-dimensional character of the film surface is increased and is particularly accentuated by way of the accurate superimposition of embossing structure and printed decoration. Images/printed images can also be "sensed" haptically as a result of the superimposed embossing structure, as a result of which the overall impression is reinforced.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
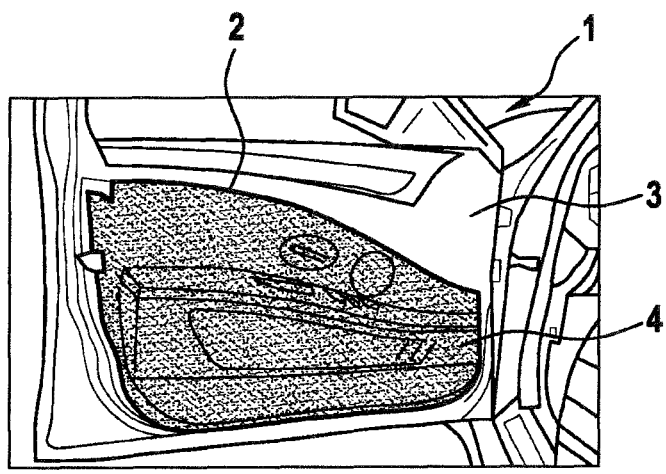
FIG. 1 shows a two-color car door with a contoured, curved color separation line.

FIG. 1 shows a two-color car door 1 with a contoured, curved color separation line 2 (two-part door trim panel), in which the color boundaries are formed by way of the method according to the invention in such a pronounced manner that the cover which separates the two color regions 3 and 4 from one another can be dispensed with.

Figure 2:
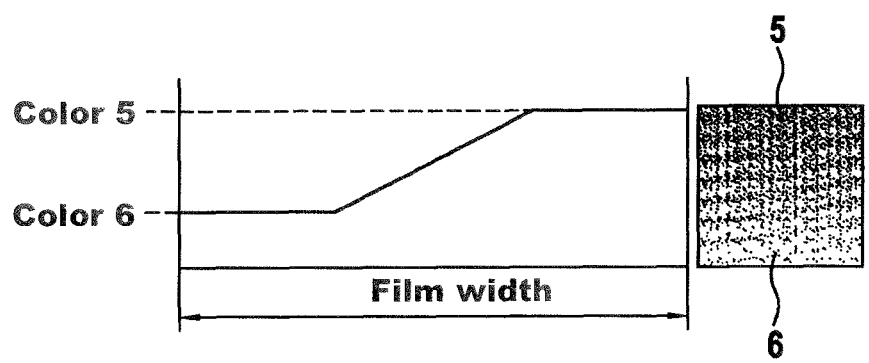
FIG. 2 shows a print according to the invention of a color transition for a film.

In principle and using a color example, FIG. 2 shows a gradient print according to the invention for a film with a soft transition from one color 5 to the other color 6.

Figure 3:
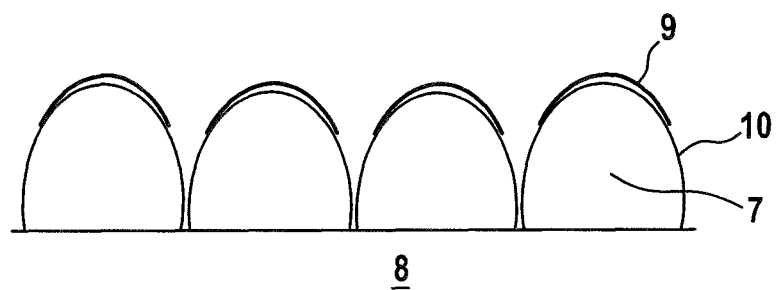
FIG. 3 is an outline sketch of what is known as "tip printing"

FIG. 3 shows an outline sketch of what is known as "tip printing", in which the three-dimensional surface structure which is applied by way of shaping methods is configured in the form of homogeneous domes 7 or projections which are as a rule rounded and are raised up from the surface of the film 8. The domes or projections 7 are provided with a color 9 as a cap which differs from the present base color 10 of the film.

Figure 4:
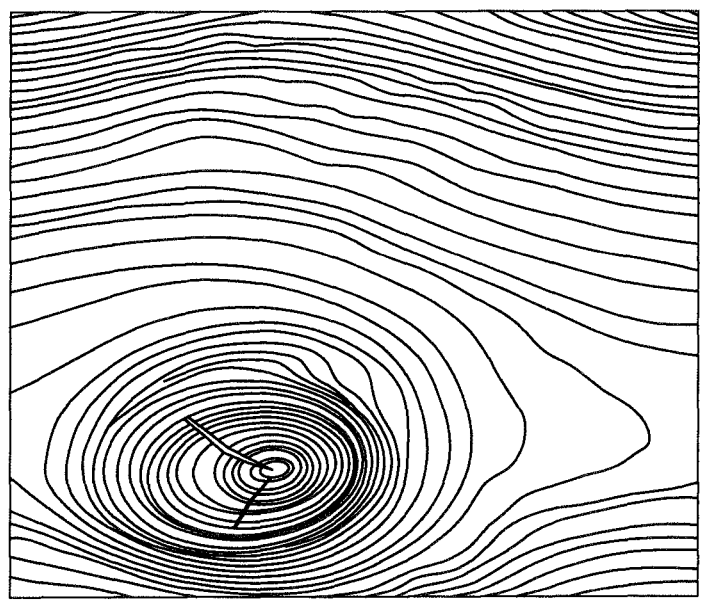
FIG. 4 is a superimposition with precise repeating patterns of structure and printed image in accordance with the method according to the invention, in the case of a wood decorative film.

FIG. 4 once again shows the superimposition with precise repeating patterns of structure and printed image in accordance with the method according to the invention, in the case of a wood decorative film made from plastic.

It is understood that the foregoing description is that of the preferred embodiments of the invention and that various changes and modifications may be made thereto without departing from the spirit and scope of the invention as defined in the appended claims.

LIST OF DESIGNATIONS

Part of the Description

1 Car door
2 Color separation line
3 Color
4 Color
5 Color
6 Color
7 Dome
8 Film
9 Color
10 Base color

What is claimed is:

1. A method for making a plastic film having a three-dimensionally structured and colored surface, the method comprising the steps of:
    providing the film with a three-dimensional surface structure via a shaping process;
    determining the provided topography of the film surface via a scanning process; and,
    applying coloring to the surface after the topography of the surface has been determined, wherein a device configured to apply coloring to the surface is controlled such that the application of coloring to the surface is changeable in dependence upon at least one of topological data of the surface and macroscopic shapes of the surface,
    wherein the surface has border regions; and, the device configured to apply coloring to the surface is controlled in such a manner that a mutually merging two-color system is applied to the border regions.

2. The method of claim 1, wherein during the application of coloring to the surface at least one of the intensity of color, the color per se, and the mixture of color are changed in dependence upon topological data of the surface.

3. The method of claim 1, wherein the film is provided with an embossed three-dimensional surface structure via an embossing roll.

4. The method of claim 1, wherein the device configured to apply coloring to the surface is a digital printing device.

5. The method of claim 1, wherein the device configured to apply coloring to the surface is an inkjet printer.

6. The method of claim 1, wherein the three-dimensional surface structure provided by the shaping process is formed as one of homogeneous domes and projections which jut from the surface of the foil.

7. The method of claim 1, wherein the three-dimensional surface structure provided by the shaping process is an identical impression of natural surfaces.

8. The method of claim 1, wherein the application of coloring to the surface is controlled in dependence upon at least one of scanned topological data and macroscopic shapes of the surface with the aid of reference marks provided on the surface.

9. The method of claim 1, wherein the application of coloring to the surface is performed such that subsequent compressions or stretching of the film can be compensated for visually.

10. An interior trim part for a vehicle comprising:
    a support body;
    a film configured to coat or trim said support body;
    said film defining a surface having a three-dimensional surface structure formed via a forming process;
    said film having a topography generated as a result of said forming process and determined via a scanning process; and, said surface having coloring applied thereto in dependence upon at least one of the topographical data and the macroscopic shapes of the surface,
wherein the surface has border regions; and, said coloring is formed in said border regions as a mutually merging two-color system.

* * * * *